9670½X
W. WOODBRIDGE.
Trigging Vehicle-Wheels.
Patented May 23, 1836.
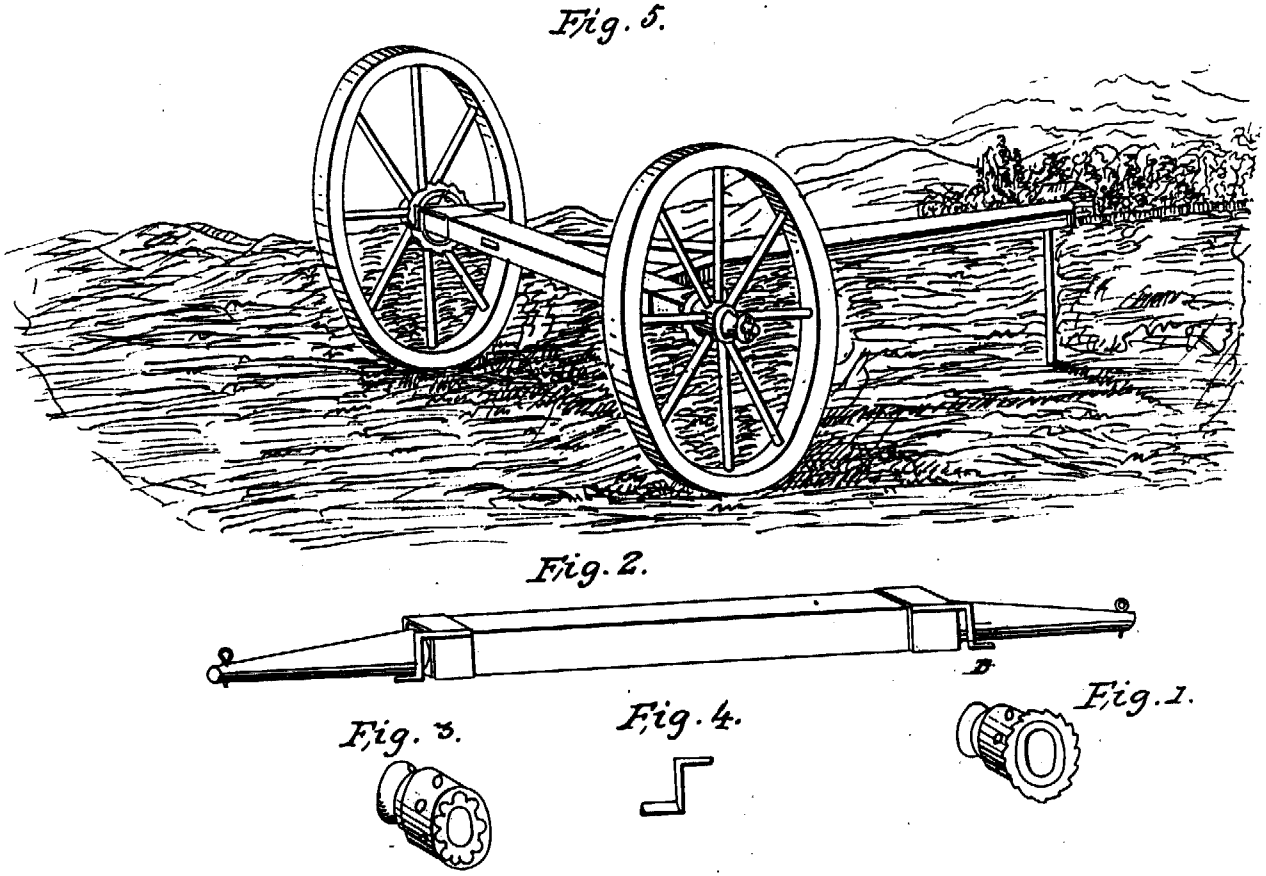
N. PETERS, PHOTO-LITHOGRAPHER, WASHINGTON, D. C.

William Woodbridge

Letters Patent

The Schedule referred to in these Letters Patent and making part of the
same containing a description in the words of the said William
Woodbridge himself of his improvement in the mode of trigging cart
and other carriage wheels. -

Whereas the trigging of the wheels of carts and other wheel carriages
has been highly convenient and useful in [illegible], detaining [illegible]
circumstances [illegible] driving them up and down hills and in-
clined planes to [illegible] them and their teams, and the loads and
passengers from injurious accidents to aid in the [illegible] of teams
while drawing heavy loads, to assist in starting loads from stand
and other [illegible] detentions by bringing the teams [illegible]
the right or opposite the rotation of a wheel on one side of [illegible]
[illegible] stopped; to prevent violent pressure upon the team when going
down hills and may be conveniently and easily employed as a
security against the running away of stage and other carriage
[illegible] when the horses are harnessed to them and the [illegible] on the
[illegible]. - And whereas no other methods of trigging [illegible]
otherwise [illegible] - [illegible] have heretofore been used or known as believed, by the
[illegible] than that of applying some obstruction to the periphery of
the wheel to prevent its rotation on the axle tree.
Therefore to all persons to whom these
presents shall come be it known that I William Woodbridge of the
Town of Hallowell in the county of Kennebec and State of Maine
Merchant have invented constructed made and applied to use
a new and useful improvement in the mode of trigging cart and
other carriage wheels by means of a [illegible] or [illegible] [illegible] fixed or
made upon the periphery of the interior ends of the hubs of cart or
carriage wheels and a [illegible] stop or hand secured to the axle tree 152. 9670 2X or by means of notches or cogs on the hubs as aforesaid and the crank stop
is [illegible] secured to the axle tree. The cog is represented as secured & fixed upon
the hub by the part marked A in Figure 1 on the annexed drawing and is
conveniently made of iron and put on the hub in the form of hoop or
may be formed by notches in the hub [illegible] with hoop a short [illegible].

The cog is used when it is wished to stop or
stay the wheel from turning one way only for instance from turning back
wards and when the cog is used the crank stop may lay upon and
play over the cog without stopping the wheel from turning forward, but the
cog in this case [illegible] the crank stop and prevents the wheel from turning
back. The crank stop or hand is marked B on figure 2. and is secured to
the axle tree by a strong iron strap marked C. in which strap is a socket
[illegible] to hold the end of the crank stop inserted into it and in which socket it
turns either way back or forward when it is wished to prevent the carriage
wheel from turning back or forward or alternately either way the notches
or cogs are to be used instead of the cog. And when it is desired to have the
wheel run free either way the crank stop may be held up out of the way
of the cogs of the hub by a stop on the body of the carriage or other means A hub with cogs or notches is represen
-ted by Figure 3 in the drawing and is most conveniently made in the form
of an iron hoop armed with cogs. The form of the crank stop may be of the same
form as the one used with the cog; and may be secured to the axle tree in
the same manner as above stated and may be held up from the hub in the
same manner when not in use but the crank stop may be permitted to
play around the cogs on the hub without being held up, in a direction opposite
to the motion of the wheel. If the arm of the crank stop so playing around
on the cogs is made as represented at "b" in figure 4 that is the form of that
arm being triangular or of a wedge form on the under side touching the cogs
to favour its sliding over them when lying on the cogs of the hub opposite
to the motion of the wheel, but when placed on the edge of the hub in the di-
rection of the motion of the wheel it will [illegible] and effectually stop the
wheel. Two of these crank stops one upon each side of the axle tree are fixed
upon it when it is intended to stop the wheels from turning either way by

9670½ means of the crank stop and cogs. When cast iron hubs are used the cogs and the cogs may be cast in one upon the hubs. The figure 3 on the annexed drawing is a pair of cast wheels with the draught or tongue forward to indicate the motion of the wheels in that direction and exhibits on the wheel marked K a cog and the position of the crank stop when stopping the wheels from running backwards. When there is no body of the carriage to interfere one crank stop placed on or near the top of the axle tree will answer the purpose to stop the wheel from turning either way when applied to the cogs and by taking out a linch pin and removing the wheel or wheels the crank stops may be taken out of the socket of the stops and laid aside if the wheels or carriages are employed in any business where this rig is not wanted.

In testimony that the above is a true specification of my said Improvement as above described I have hereto set my hand this fifteenth day of March in the Year of our Lord one thousand eight hundred and thirty six.

Wm. Woodbridge

Exd. [illegible]

Witnesses
Thomas Hinkley
Simeon Harding

1050

Drawing